Jan. 27, 1970   C. ADAHAN   3,491,612
DROP-PARK TRANSMISSION RATIO SELECTOR LEVER
Filed Feb. 20, 1968   3 Sheets-Sheet 1
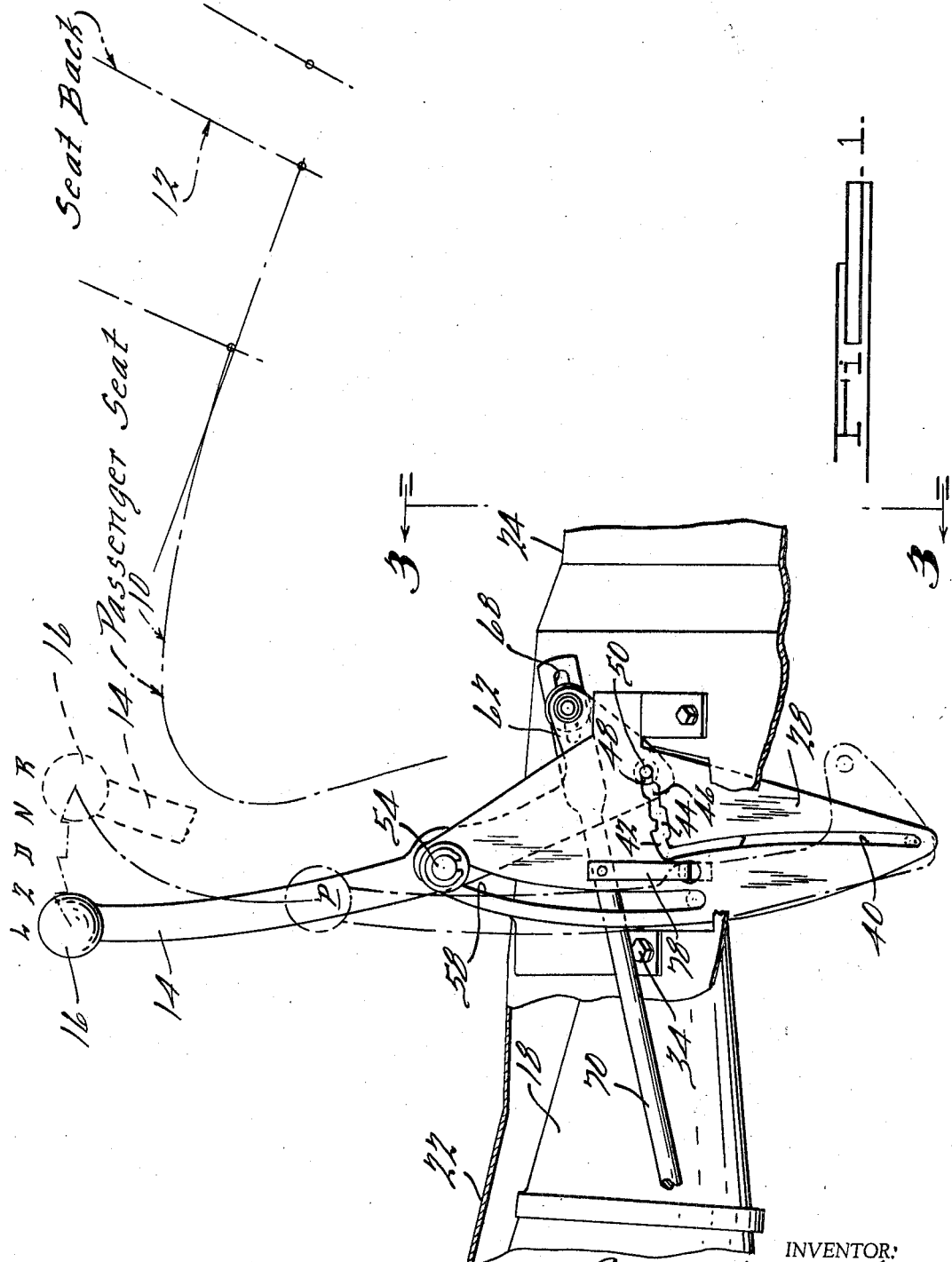
INVENTOR:
Carmeli Adahan
BY
ATTORNEYS.

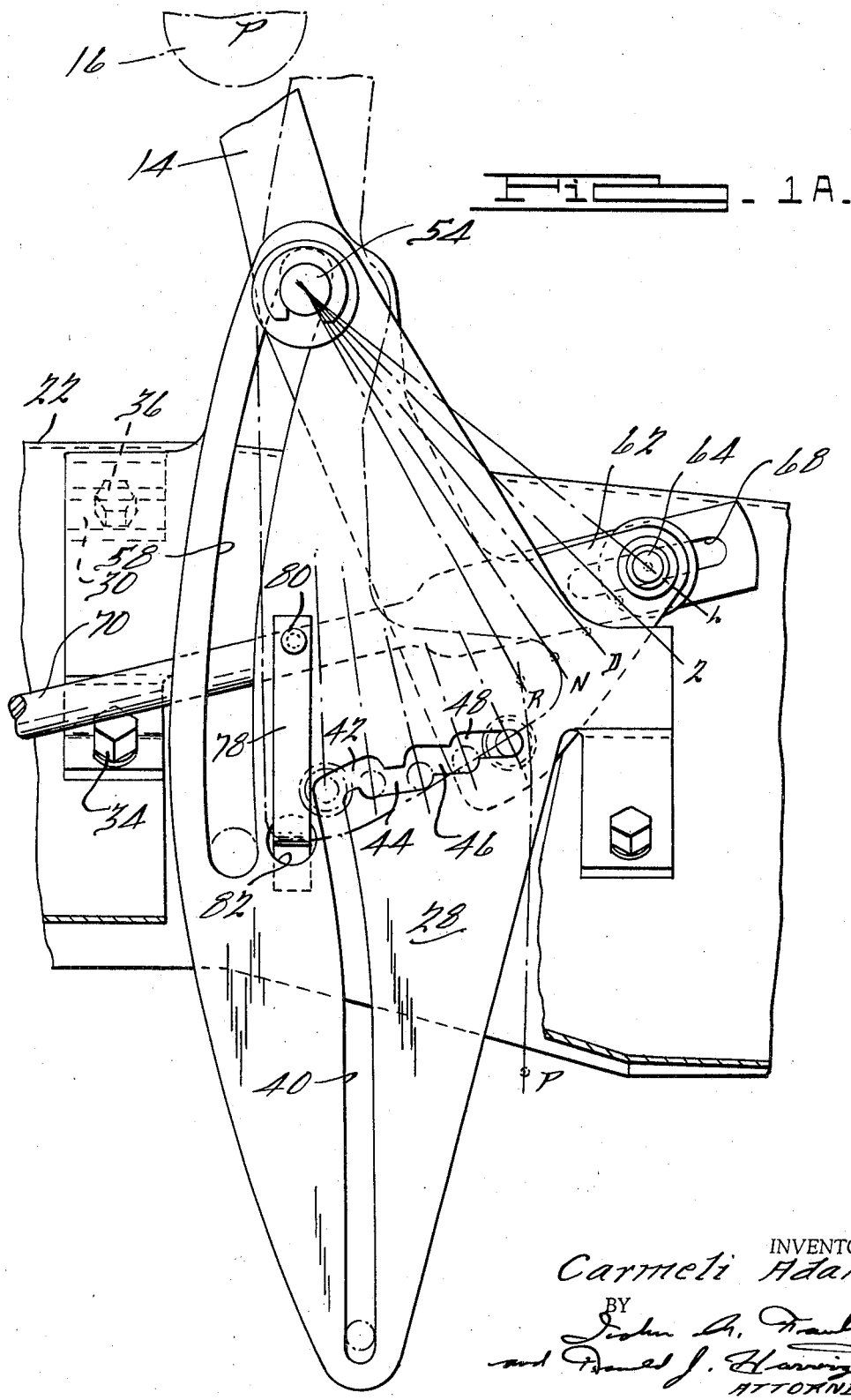

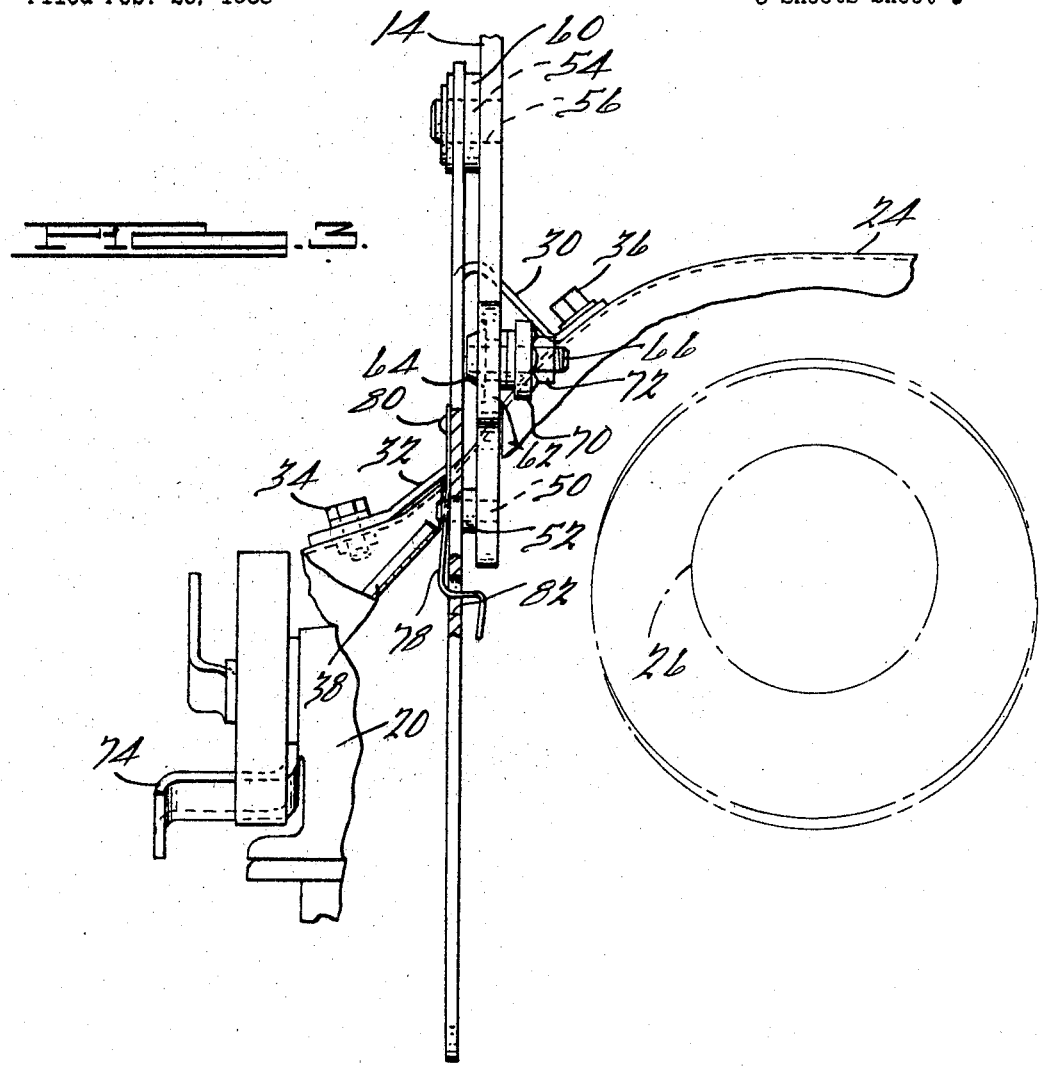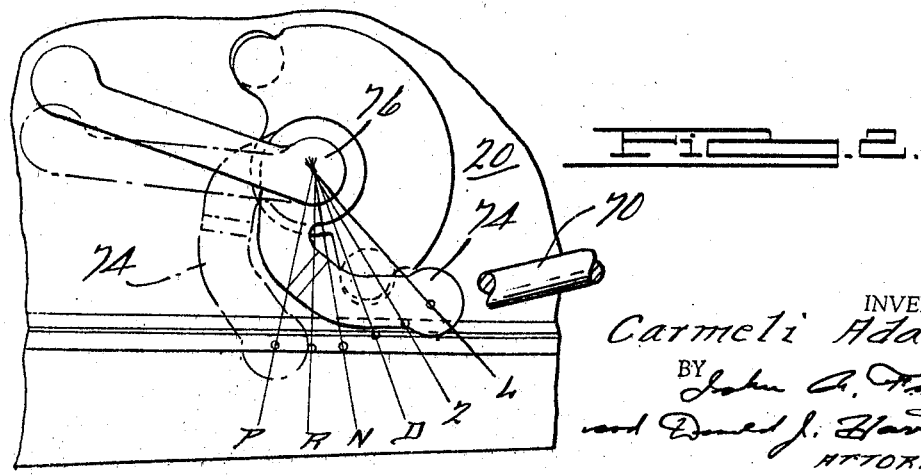

United States Patent Office 3,491,612
Patented Jan. 27, 1970

3,491,612
DROP-PARK TRANSMISSION RATIO
SELECTOR LEVER
Carmeli Adahan, Dearborn, Mich., assignor to Ford
Motor Company, Dearborn, Mich., a corporation
of Delaware
Filed Feb. 20, 1968, Ser. No. 706,946
Int. Cl. G05g 9/00
U.S. Cl. 74—473                                  10 Claims

ABSTRACT OF THE DISCLOSURE

This specification describes a ratio controlling transmission lever in an automotive vehicle driveline. The lever is combined with a transmission park mechanism so that the vehicle operator may control both the parking mechanism and the ratio controlling element of the transmission. Ratio selection is accomplished by moving the ratio controlling lever about a fixed pivot point with a relatively constant mechanical advantage. Engagement and release of the parking mechanism is obtained with a so-called push-pull motion, as distinct from the arcuate motion of the control lever during ratio selection, which results in an increased mechanical advantage.

GENERAL DESCRIPTION OF THE INVENTION

This specification describes a gear shift linkage for use in a power transmission mechanism for an automotive vehicle driveline. It is adapted especially for use with a driveline having an automatic power transmission mechanism in which the ratio changes are accomplished by motion of the selector lever in a single operating plane. The selector lever is connected in turn to a ratio controlling pressure distributor valve, and the various operating positions of the lever correspond to each of the several drive range positions of the valve.

The linkage of my invention enables the vehicle operator to control the position of the shift lever from a remote position within the vehicle passenger compartment. The gear shift control includes a lever that is pivoted on a stationary chassis member, and one end of the lever is connected mechanically to the ratio selector lever in the transmission. A pin and slot connection between the lever and a fixed chassis member establishes fixed detent points which define each of the operating positions of the lever. When the control lever is moved from one operating position to the other, the ratio selector lever is adjusted to its appropriate position as the mechanical motion transmitting ratio between the control lever and the selector lever remains constant.

A transmission park mechanism is connected mechanically to the control lever through the transmission selector lever. To provide actuation of the park mechanism, the control lever is moved in a downward direction to establish a camming action between the pivot point for the control lever and the fixed chassis member, thereby increasing the mechanical advantage of the motion transmitting elements. This reduces the effort required to actuate and release the parking mechanism, and it also permits the control lever to be moved to a position where it will not interfere with the vehicle passengers when the vehicle is parked.

BRIEF DESCRIPTION OF THE FIGURES OF THE DRAWING

FIGURE 1 is a side elevation view of the ratio controlling mechanism of my invention;

FIGURE 1A is an enlarged view of a portion of FIGURE 1.

FIGURE 2 is a side elevation view of the ratio selector lever on the automatic transmission; and FIGURE 3 is an end view of the structure of FIGURE 1 as seen from the plane of section line 3—3 of FIGURE 1.

PARTICULAR DESCRIPTION OF THE INVENTION

In FIGURE 1 numeral 10 designates the outline of the passenger seat in the forward portion of the vehicle passenger compartment. Numeral 12 designates the outline of the vehicle backrest for the seat shown at 10. The position of the backrest can be adjusted to any one of the positions shown in FIGURE 1 by means of phantom lines.

Numeral 14 identifies the transmission ratio control lever. It may be gripped by the vehicle operator at the upper end where a suitable hand grip 16 is provided.

The rear transmission extension housing 18 is joined to the main transmission housing 20. Both housings are situated below the vehicle floor pan 22. The floor pan is raised at 24 to accommodate the power transmission output shaft and drive shaft which extend in a rearward direction to a differential gear and axle assembly. The drive shaft is shown schematically in FIGURE 3 at 26.

The gear shift lever assembly includes a relatively stationary guide plate 28 which extends in a generally vertical plane through the floor pan 22. The left-hand margin of the plate 28 seen in FIGURE 3 is formed with brackets 30 and 32. Clamping bolts 34 and 36, clamp the brackets 32 and 30 to the floor pan 22 and hold the plate 28 in a fixed position. Another clamping bracket 38 is formed on the right-hand margin of the plate 28. This also is seen in FIGURE 3.

The lower part of the plate 28 is formed with an elongated cam slot 40. The upper end of the slot 40 intersects slot portion 42. This slot portion is connected to slot portion 44 which is situated slightly below the slot portion 42, thereby providing a discontinuity. Slot portion 44 in turn is connected to slot portion 46, the latter being situated slightly above the slot portion 44. Slot portion 46 communicates with slot portion 48, the latter being situated slightly above slot portion 46. A discontinuity is provided between each of the connecting slot portions. All of the slot portions extend generally perpendicularly with respect to the slot 40.

The lower end of the control lever 14 has secured thereto a guide pin 50, as best seen in FIGURE 3. This lower portion extends generally parallel to the plane of the guide plate 28. The pin 50 is fixed within a cooperating aperture formed in the lower portion of the control lever 14, and it extends through the slot portions in the guide plate 28. In FIGURE 1 the pin 50 is shown in the slot portion 48. This corresponds to the low speed ratio position for the control lever 14. A spacer 52 surrounds the pin 50 and it is situated between the guide plate 28 and the lower portion of the control lever 14.

A pivot pin 54 is fixed within an opening 56 formed in the control lever 14. It extends through an arcuate cam slot 58 formed in the guide plate 28. A spacer 60 is situated between the upper end of the guide plate 28 and the control lever 14 as indicated in FIGURE 3.

The lower end of the control lever 14 is provided with an ear 62 having an opening within which is positioned a friction reducing grommet 64. Extending through the grommet 64 is a pin 66. This pin is extended through an elongated slot 68 formed in one end of a control linkage element 70. The pin 66 is held in place in the slot 68 by clamping nut 72.

Linkage element 70 extends in a generally downward direction below the floor pan 22. It is connected at its left-hand end, as seen in FIGURE 2, to selector lever 74. This is mounted on a control shaft 76, which in turn is journalled in the transmission casing and situated in mechanical engagement with the transmission manual selector valve. As the lever 74 moves to one of the operating positions indicated by reference characters P, R, N, D, 2 and L, the transmission is conditioned, respectively, for park, reverse drive operation, neutral, direct drive, automatic drive range operation, second speed ratio operation or low speed ratio operation. When the control lever 14 is adjusted about the axis of the pivot in 66, the shift lever 74 assumes its various operating positions.

In FIGURE 1, position R corresponds to the reverse drive position, position N corresponds to neutral drive position, position D corresponds to the direct drive automatic drive range position, position 2 corresponds to the intermediate speed ratio operating portion and symbol L corresponds to low speed range position.

When the control lever 14 is removed from position L to position 2, the pin 50 moves from the right-hand end of the slot portion 48 to its left-hand end. The discontinuity located at the left-hand end of the slot portion 48 provides a detent that establishes the intermediate position 2. To continue moving the control lever 14 from the 2 position to the D position, it is necessary to allow the pin 50 to drop from the slot portion 48 to the slot portion 46. Continued arcuate movement of the control lever 14 in a clockwise direction, as viewed in FIGURE 1, then will cause the pin 50 to move to the left-hand end of the slot portion 46, which corresponds to the D position. Continued motion of the control lever 14 in a clockwise direction can be continued after the pin 50 is caused to drop to the next slot portion 44. The control lever 14 can be moved back and forth between the neutral position and the D position as the pin 50 slides along the slot portion 44.

It is necessary to raise the control lever 14 to shift to the reverse position. At that time the pin 50 is raised from the slot portion 44 to the slot portion 42 over the intervening reverse detent shoulder. After the pin 50 is raised by pulling up on the grip 16, the lever 14 then can be moved to the reverse position R.

The pin 54 has freedom of motion within the slot 58 which will permit the limited travel necessary to permit movement of the pin 50 from one slot portion to the other.

The lever 14 can be moved to the park position by pushing down on the grip 16. This will cause the pin 54 to slide within the arcuate slot 58 from the upper portion to the lowest position. As it does this, the pin 50 travels in its elongated slot 40. As the lever 14 moves downwardly, the linkage element 70 is caused to shift in a left-hand direction, as viewed in FIGURES 1 and 2, thereby causing the shift lever 74 to move from the reverse position to the park position P. The camming action of the pin 54 and the arcuate slot 58, and the guiding action of the pin 50 within the slot 40 provide an increased mechanical advantage that is greater than the mechanical advantage that is available when the control lever 14 acts as a simple pivotal lever. During the shifting movement between the reverse position and the park position, the lever 14 and the cooperating pins 15 and 54 act as a cam rather than as a pivot lever.

To move the control lever 74 from the park position to the reverse position, it merely is necessary to raise the grip 16 with a pulling action. Again the mechanical advantage made available by the cam pins and slots permits withdrawal of the parking mechanism from the park position with a minimum amount of effort.

Before movement of the control lever 14 from the reverse position to the park position, it is necessary to move the pin 50 from the upper end of the slot 40 to its lower end. The direction of the slots 40 and 58 is such that the control linkage 70 is moved to its park position before the pin 50 reaches the bottom end of the slot 40. This is a safety feature since the pin will overtravel as the control lever 14 is moved to the park position, thus assuring that the vehicle is in park with no possibility of inadvertent release of the park mechanism. In one preferred embodiment, the control element 70 is moved to its park position when the pin 50 has travelled ⅔ of the length of the slot 40.

Before movement of the pin 50 from a reverse position to the park position can take place, it is necessary for the operator to overcome the force of detent spring 78. The seat shown at 10 remains fixed relative to the floor pan 22. It is possible, therefore to adjust conveniently the control lever 14 regardless of the position of the backrest shown in phantom lines at 12. When the control lever is moved to a downward position corresponding to the park position, the control lever is located where it will not interfere with the front seat passengers. When it moves in the downward direction, the force of the detent spring 78 is overcome.

Detent spring 78 is in the form of a cam spring which is riveted or otherwise secured to the guide plate 28, as shown at 80. The end of the spring 78 extends through an opening 82 in the drive plate 28. This end is situated in the path of motion of the control lever 14. The end of the control lever 14 must push the end of the cam lever spring 78 inwardly through the opening 82 before the control lever 14 can move to the park position. Once the detent force of the spring 78 is overcome, however, the spring 78 will not provide resistance to continued motion of the control lever 14 in a downward direction. The vehicle operator can determine visually whether the transmission is in a park position or in the drive position simply by observing the position of the grip 16.

To remove the lever 14 from the reverse position, it merely is necessary to pull up on the grip 16 so that the end of the lever 14 again will ride over the end of the detent spring 78. As it does this, the control linkage element 70 will move to the reverse position as explained previously.

Having thus described a preferred form of my invention, what I claim and desire to secure by U.S. Letters Patent is:

1. In a gear shift mechanism for an automatic power transmission in a vehicle driveline for a wheeled vehicle, a control lever support plate mounted generally vertically on a fixed portion of said vehicle, a control lever, a cam slot formed in said support plate, a pivot pin carried by said control lever at an intermediate portion thereof and extending through said cam slot, one end of said control lever being adapted to be gripped by an operator of the vehicle, means for connecting the other end of the control lever to ratio controlling elements of said transmission mechanism including a linkage element shiftable in the direction of its axis, a guide slot having a generally vertical portion and a second portion situated on an angle with respect to said vertical portion, a guide pin carried by the other control lever end, said guide pin extending through said guide slot and movable from one position to the other in said second guide slot portion as one end of said control level is shifted arcuately about the axis of said pivot pin.

2. The combination as set forth in claim 1 wherein the said second guide slot portion comprises multiple slot segments, each segment being situated at a different level than its adjacent one whereby a discontinuity in the form of detent shoulders are defined between each segment.

3. The combination as set forth in claim 2 wherein the said cam slot is formed on an arc, said pivot pin being movable through said arc as said control lever is pressed from one level to another, said other end of said control lever being shifted with a camming action toward a park position of said shift lever as said pivot pin moves downwardly in said cam slot.

4. The combination as set forth in claim 3 wherein said guide pin moves from an upper level to a lower level as said one end of said control lever is shifted arcuately in one direction to its various drive range positions, a reverse detent shoulder at a location near the intersection of said first and second guide slot portions, said guide pin being adapted to move upwardly with respect to said guide plate and over said reverse detent shoulder as said control lever is moved from a forward drive range position before assuming a reverse drive position.

5. The combination as set forth in claim 4 wherein said mechanism includes detent spring means for resisting the displacement of said guide pin from the reverse drive position to a position in the lower end of said vertical portion of said guide slot, said transmission control lever assuming its park position as said guide pin approaches the lower end of said vertical portion of said guide slot.

6. The combination as set forth in claim 2 wherein said guide pin moves from an upper level to a lower level as said one end of said control lever is shifted arcuately in one direction to its various drive range positions, a reverse detent shoulder at a location near the intersection of said first and second guide slot portions, said guide pin being adapted to move upwardly with respect to said guide plate and over said reverse detent shoulder as said control lever is moved from a forward drive range position before assuming a reverse drive position.

7. The combination as set forth in claim 1 wherein the said cam slot is formed on an arc, said pivot pin being movable through said arc as said control lever is pressed from one level to another, said other end of said control lever being shifted with a camming action toward a park position of said shift lever as said pivot pin moves downwardly in said cam slot.

8. The combination as set forth in claim 7 wherein said guide pin moves from an upper level to a lower level as said one end of said control lever is shifted arcuately in one direction to its various drive range positions, a reverse detent shoulder at a location near the intersection of said first and second guide slot portions, said guide pin being adapted to move upwardly with respect to said guide plate and over said reverse detent shoulder as said control lever is moved from a forward drive range position before assuming a reverse drive position.

9. The combination as set forth in claim 8 wherein said mechanism includes detent spring means for resisting displacement of said guide pin from the reverse drive position to a position in the lower end of said vertical portion of said guide slot, said transmission control lever assuming its park position as said guide pin approaches the lower end of said vertical portion of said guide slot.

10. The combination as set forth in claim 1 wherein said guide pin moves from an upper level to a lower level as said one end of said control lever is shifted arcuately in one direction to its various drive range positions, a reverse detent shoulder at a location near the intersection of said first and second guide slot portions, said guide pin being adapted to move upwardly with respect to said guide plate and over said reverse detent shoulder as said control lever is moved from a forward drive range position before assuming a reverse drive position.

References Cited
UNITED STATES PATENTS 2,961,890  11/1960  Marshall _____ 74—473
3,364,779   1/1968  Cambria _____ 74—473

MILTON KAUFMAN, Primary Examiner